United States Patent
Sundaram (10) Patent No.: US 10,516,490 B2
(45) Date of Patent: Dec. 24, 2019

(54) OPTICAL FREE AIR TRANSMIT AND RECEIVE INTERCONNECT

(71) Applicants: INTEL CORPORATION, Santa Clara, CA (US); Arvind Sundaram, Bangalore (IN)

(72) Inventor: Arvind Sundaram, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/325,140

(22) PCT Filed: Sep. 29, 2016

(86) PCT No.: PCT/US2016/054444
§ 371 (c)(1),
(2) Date: Feb. 12, 2019

(87) PCT Pub. No.: WO2018/063247
PCT Pub. Date: Apr. 5, 2018

(65) Prior Publication Data
US 2019/0190619 A1     Jun. 20, 2019

(51) Int. Cl.
*H04B 10/80* (2013.01)
*H04B 10/114* (2013.01)
*H04B 10/40* (2013.01)

(52) U.S. Cl.
CPC ....... *H04B 10/803* (2013.01); *H04B 10/1143* (2013.01); *H04B 10/40* (2013.01)

(58) Field of Classification Search
CPC ............ H04B 10/11–118; H04B 10/40; H04B 10/804
See application file for complete search history.

(56) References Cited

U.S. PATENT DOCUMENTS

| | | | | |
|---|---|---|---|---|
| 5,963,349 A | * | 10/1999 | Norte | H04B 10/40 398/1 |
| 7,400,801 B1 | * | 7/2008 | Tong | G02B 6/1228 385/14 |
| 2001/0000621 A1 | | 5/2001 | Mitsuda et al. | |
| 2003/0081288 A1 | * | 5/2003 | Ishii | H04B 10/114 398/135 |
| 2004/0264910 A1 | * | 12/2004 | Suzuki | G02B 6/00 385/146 |
| 2007/0248299 A1 | | 10/2007 | Welch et al. | |
| 2009/0067843 A1 | | 3/2009 | Way et al. | |

(Continued)

FOREIGN PATENT DOCUMENTS

WO    WO-2018063247 A1    4/2018

OTHER PUBLICATIONS

"International Application Serial No. PCT/US2016/054444, International Search Report dated May 24, 2017", 6 pgs.

(Continued)

*Primary Examiner* — Casey L Kretzer
(74) *Attorney, Agent, or Firm* — Schwegman Lundberg & Woessner, P.A.

(57) ABSTRACT

An apparatus comprises a substrate; a laser emitter arranged on the substrate, wherein laser energy emitted by the laser emitter includes a center frequency; a photodiode arranged on the substrate; and a laser bandpass filter arranged above the photodiode, wherein the bandpass filter has a passband that excludes the center frequency of the laser energy.

18 Claims, 4 Drawing Sheets

(56) References Cited

U.S. PATENT DOCUMENTS

| | | |
|---|---|---|
| 2010/0014874 A1 | 1/2010 | Kawanishi et al. |
| 2015/0270900 A1* | 9/2015 | Hilario ................. G02B 6/4204 |
| | | 398/140 |
| 2017/0244490 A1* | 8/2017 | Hallal .................... H04B 10/80 |

OTHER PUBLICATIONS

"International Application Serial No. PCT/US2016/054444, Written Opinion dated Apr. 24, 2017", 7 pgs.

Abelardo, Lopez-Lagunas, et al., "Bidirectional Single Fiber Low-Cost Optoelectronic Interconnect for Automotive Applications", In: IEEE Transactions on Vehicular Technology,vol. 49, Issue 1, (Aug. 6, 2002), 281-286.

"International Application Serial No. PCT US2016 054444, International Preliminary Report on Patentabiity dated Apr. 11, 2019", 9 pgs.

\* cited by examiner

OPTICAL FREE AIR TRANSMIT AND RECEIVE INTERCONNECT

CLAIM OF PRIORITY

This patent application is a U.S. National Stage Application under 35 U.S.C. 371 from International Application No. PCT/US2016/054444, filed Sep. 29, 2016, published as WO2018/063247, which is incorporated herein by reference.

TECHNICAL FIELD

Embodiments pertain to high speed interconnections in electronic systems, and more specifically to optical communication interfaces between electronic devices.

BACKGROUND

Electronic systems often include electronic devices that communicate signals to each other. Designers of electronic systems strive to increase the speed of the communication among devices while keeping the communication link robust. Wireless connections can be more robust than wired connections because of the elimination of the need for mechanical contact that may be susceptible to wear. Wireless interfaces typically communicate using radio frequency (RF) signals. However, some limitations of RF communication interfaces include bandwidth limitations, signal interference, and overhead associated with RF protocols. Optical signals can be an alternative to RF and can achieve higher data rates. However, traditional optical interconnects require special fiber-optic cables, which can be more expensive than wired interfaces, and can require air tight glass-to-glass connections to prevent Fresnel reflections, making them less desirable and, in certain examples, impractical for day-to-day free-air interconnects. There is a general need for devices, systems and methods to address requirements for high-speed interconnections among electronic devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

There are many types of communication interfaces between electronic devices. These include universal serial bus (USB), mobile industry processor interface (MIPI), peripheral component interconnect (PCI), PCI express (PCIe), high definition multimedia interface (HDMI), thunderbolt (TBT), display port (DP) interface, and other serial busses and serial-parallel busses used in consumer electronics, enterprise class devices, wearable electronic devices, portable computers, and tablet computers. It is desirable to implement a wireless communication interface that can provide improved data rate and can adapt basic wireless interconnection with all of the protocols available and yet not be tied to any one specific protocol. An infrared-based interface is an alternative to an RF interface, but an IR-based interface involves conversion between protocols, which adds overhead to the communication. A laser-based optical interface would meet these requirements for the interconnection, but the cost of fiber optic based optical interconnections can be prohibitive.

A better option is a laser-based optical interface that does not use fiber optics to transmit and receive the laser emitted signals, but instead transmits the optical signals via free air space (e.g., a light amplitude modulation docking adapter, or LAMDA). This can be accomplished by communicating the optical signals over short distances (e.g., about ten millimeters, or 10 mm) so that signal loss is tolerable. The free air optical interface can scale to data rates up to ten gigabits per second (10 Gbps) and rates of one terabit per second (1 Tbps) may be available. This type of optical interface is not tied to any specific protocol and eliminates protocol overhead, which reduces the latency in communication to near zero latency. Further, the interface is agnostic to clock rate, making the interface compatible with high speed and low speed interfaces.

Figure 1:
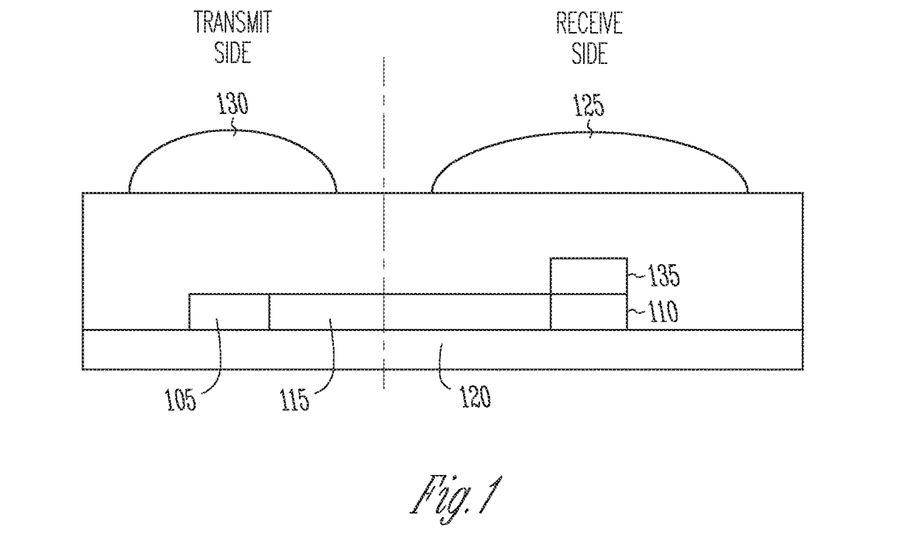
FIG. 1 is an illustration of an optical transmitter (TX) receiver (RX) pair in accordance with some embodiments.

FIG. 1 is an illustration of an embodiment of an optical transmitter (TX) receiver (RX) pair. The optical TX/RX pair can include a laser emitter 105, such as a laser diode or a vertical-cavity surface emitting laser (VCSEL) for example. The optical TX/RX pair includes an optical receiver that detects laser energy, such as a photodiode 110 to convert received laser energy into an electrical signal. A transimpedance amplifier 115 (TIA) can be used to amplify the electrical signal generated by the photodiode. The laser emitter 105 and the photodiode 110 are arranged on a substrate 120. Some examples of the substrate 120 include a printed circuit board (PCB) made of plastic, plastic laminate (E.g., FR4) or ceramic.

To form a serial optical interface, a second optical TX/RX pair can be positioned opposite the optical TX/RX pair in FIG. 1. The laser emitter of the second optical TX/RX pair is arranged opposite the optical receiver of the first optical TX/RX pair to create a first communication lane, and the laser emitter of the first optical TX/RX pair is arranged opposite the optical receiver of the second TX/RX pair to form a second communication lane in the reverse direction from the first communication lane. An air gap separates the two TX/RX pairs. The separation between the two optical TX/RX pairs is small (e.g., about 2.5 mm). The small separation allows for the receivers to reliably detect the laser energy from the laser emitters. The TX/RX pair can include a lens 125 to focus incident laser energy onto the photodiode 110. The TX/RX pair may also include a second lens 130 to focus the emitted laser energy toward the receiving photodiode across the air gap. The lenses 125, 130 may be epoxy molded lenses.

In some embodiments, the photodiode 110 has a wide spectral response (e.g., an indium gallium arsenide (InGaAs) photodiode). The wide spectral response is desirable for detection of laser energy transmitted over air, but can cause problems of crosstalk between the two communication lanes. To reduce or eliminate crosstalk between communication lanes, a laser bandpass filter 135 is arranged above the photodiode 110 of each TX/RX pair. In some embodiments, the laser bandpass filter 135 can be a Lyot filter or a dichroic filter arranged above the photodiode 110. In some embodiments, the laser bandpass filter 135 is formed as a coating (e.g., an anti-reflective coating, or ARC) on the photodiode using ion beam sputtering (IBS).

The laser emitter emits laser energy at a specified or predetermined wavelength. This wavelength corresponds to a center frequency or center frequency range for the emitted laser energy. The laser bandpass filter 135 of a TX/RX pair has a passband that excludes the center frequency of the laser energy (or a frequency range centered at the center frequency) emitted by the laser emitter of the TX/RX pair, but the passband includes the center frequency of the laser energy emitted by the laser emitter of the communication lane of the photodiode. Thus, the laser bandpass filter 135 reduces or eliminates laser energy from one communication lane from being detected by the other communication lane. In some embodiments, the center frequency of a laser emitter is assigned based on whether the laser emitter is included in a host device or a peripheral device (e.g., a disk drive). If a TX/RX pair is included in a host device, the TX/RX pair includes a laser emitter having a first center frequency and a laser bandpass filter that excludes the first center frequency. If a TX/RX pair is included in a peripheral device, the TX/RX pair includes a laser emitter having a second center frequency and a laser bandpass filter that excludes the second center frequency and passes the first center frequency. The TX/RX pair of the host device includes a laser bandpass filter that passes the second center frequency. Thus, the passband of the laser bandpass filter is selected according to whether the TX/RX pair is included in the host device or the peripheral device.

Figure 2:
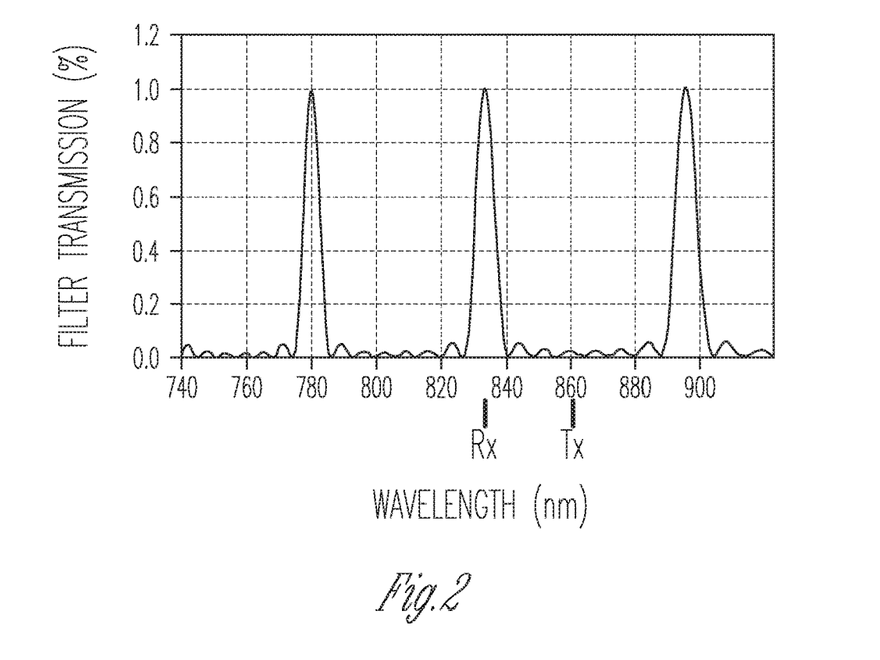
FIG. 2 is an example of a filter characteristic for a laser bandpass filter in accordance with some embodiments.

FIG. 2 is an example of a filter characteristic for a laser bandpass filter. The example is intended to be illustrative and non-limiting. The filter characteristic shows filter transmission versus wavelength. In the example, a host device laser emitter emits laser energy with a wavelength of 855 nanometers (nm), and a peripheral laser emitter emits laser energy with a wavelength of about 830 nm (or 0.361 GHz). FIG. 2 shows an example of a filter characteristic for the host device. The filter shows very high attenuation at 855 nm and shows that the passband of the filter includes 830 nm. The passband may include a wavelength range (e.g., 5-6 nm) centered at the laser energy wavelength.

Figure 3:
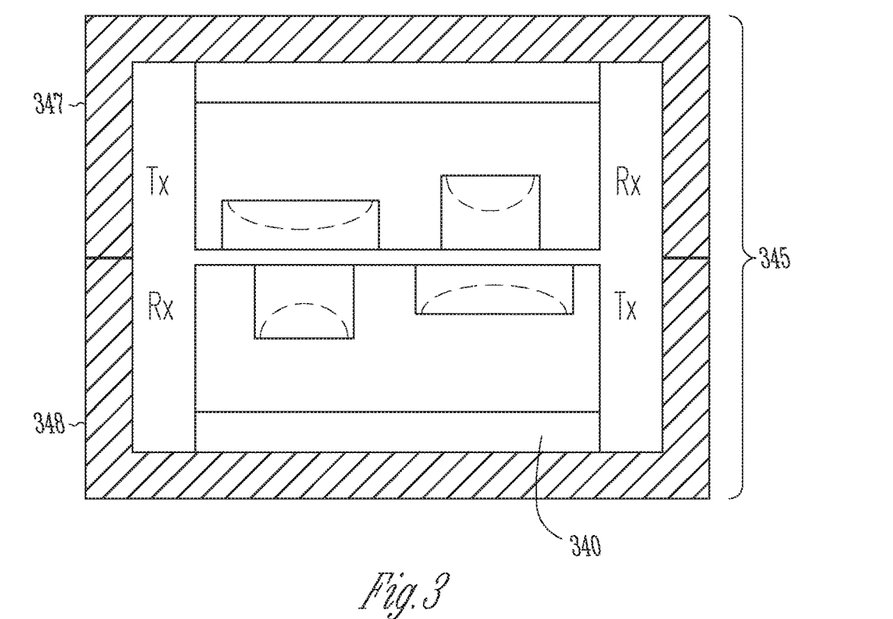
FIG. 3 is an illustration of an arrangement of optical TX/RX pairs in accordance with some embodiments.

FIG. 3 is an illustration of an embodiment of an arrangement between optical TX/RX pairs of the optical interface host side and the optical interface peripheral side. An optical TX/RX pair may be electrically connected to logic circuitry 340 on the substrate. The logic circuitry 340 transmits and receives signals communicated according to a duplex communication protocol, such as a USB protocol. In certain embodiments, the substrate is an electronics package substrate and the laser emitter 305, the photodiode 310, and the logic circuitry 340 may be included in the same electronics package.

As explained previously, the TX laser emitters are placed opposite the RX photodiodes across a small air gap to form the communication lanes of the optical interface. The optical interface can include a mechanical connector 345 to house the interface and protect against interference from outside sources. The mechanical connector 345 may include first connector body portion 347 and a second connector body portion 348. The optical interface host side can be included in the first connector body portion 347 and the optical interface peripheral side can be included in the second connector body portion 348.

A complication can arise if the arrangement of the optical TX/RX pairs are reversed when the connector body portions of the mechanical connector are joined incorrectly. This can result in the TX emitter being arranged opposite each other and the RX photodiodes arranged opposite each other. The receive lenses may be placed opposite each other and the transmit lenses may be placed opposite each other. This misalignment of parts may lead to link failure.

Figure 4:
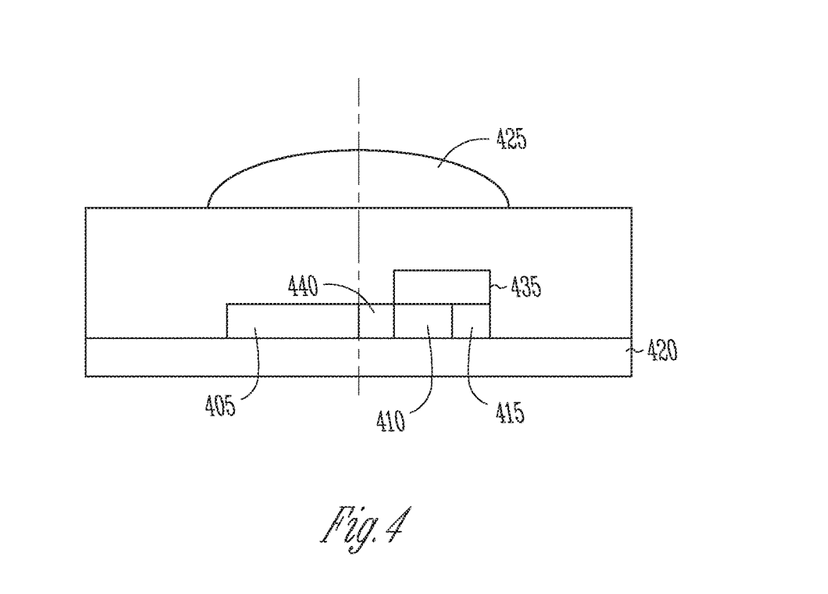
FIG. 4 shows is an illustration of another optical TX/RX pair in accordance with some embodiments.

FIG. 4 is an illustration of another embodiment of an optical TX/RX pair. The optical TX/RX pair includes a laser emitter 405 and a photodiode 410 arranged on a substrate 420. The laser emitter 405 and the photodiode 410 are arranged closer together than in the embodiment of FIG. 1. The TX/RX pair may include a TIA 415 that is arranged on the other side of the photodiode 410 away from the laser emitter 405 to allow the laser emitter 405 and the photodiode 410 to be arranged closer together. The TX/RX pair includes a laser bandpass filter 435 arranged above the photodiode 410. As explained above, the center frequency of the laser emitter 405 and passband of the laser bandpass filter 435 are selected according to whether the TX/RX pair is included in a host device or a peripheral device. The TX/RX pair may also include an isolation barrier 440 arranged on the substrate 420 between the laser emitter 405 and the photodiode 410. In certain embodiments, the isolation barrier 440 comprises metal.

The optical TX/RX pair can include a single lens 425 arranged above the substrate 420, laser emitter 405, and photodiode 410. The lens 425 focuses laser energy received over air and incident to the lens toward the photodiode 410. Because only one lens is used, the TX/RX pair is more robust under non-ideal alignment of the host device TX/RX pair and the peripheral device TX/RX pair. In some embodiments, the lens 425 includes a hybrid curvature determined by the laser spread inside the optical interface and the curvature needed to focus the laser onto the photodiode with the desired intensity. In some embodiments, the lens is shaped to focus the laser energy toward the photodiode as a focal line. This may be achieved with a lens curvature that is part cylindrical. The hybrid curvature of the lens 425 allows the communication link to be operable with different orientations between the host device TX/RX pair and the peripheral device TX/RX pair.

Figure 5:
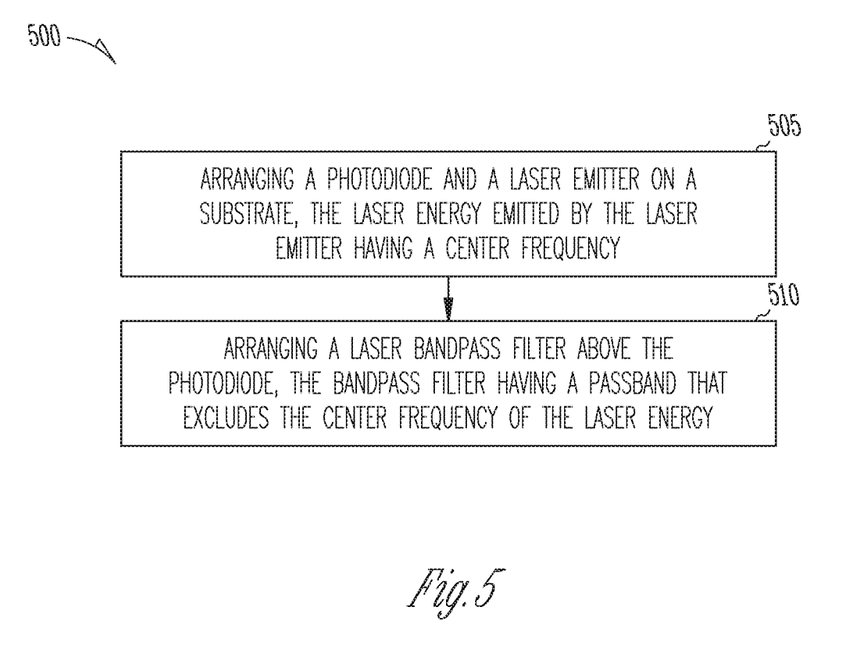
FIG. 5 is a flow diagram of a method of making a TX/RX pair in accordance with some embodiments.

FIG. 5 is a flow diagram of an embodiment of a method 500 of making a TX/RX pair. At 505, a photodiode and a laser emitter are arranged on a substrate. In some embodiments, the laser emitter is a VCSEL and the photodiode is a type of photodiode having a wide spectral response. In some embodiments, a TIA is also arranged on the substrate. In certain embodiments, the TIA is arranged between the laser emitter and the photodiode as shown in the example of FIG. 1. In certain embodiments, an isolation barrier is arranged on the substrate between the laser emitter and the photodiode, and the TIA is included on the photodiode side of the substrate as shown in the example of FIG. 4.

The substrate may be a printed circuit board (PCB) and the photodiode and the laser emitter may be mounted on the top side of the PCB, and the PCB may include solder pads on the bottom side. In certain embodiments the substrate includes ceramic, and in certain embodiments the substrate includes plastic. The laser energy emitted by the laser emitter has a specified center frequency.

At 510, a laser bandpass filter is arranged above the photodiode. The passband of the laser bandpass filter excludes the center frequency of the laser energy emitted by the laser emitter. In some embodiments, the bandpass filter includes a coating formed on the photodiode using IBS. The properties of the coating (e.g., coating material, coating thickness, etc.) determine the filter characteristics of the laser bandpass filter. In some embodiments, the laser bandpass filter includes a dichroic filter formed on the laser bandpass filter. In some embodiments, the laser bandpass filter includes a Lyot filter arranged above the photodiode.

In some embodiments, two lenses are arranged above the substrate, laser emitter, and the photodiode as in shown in the embodiment of FIG. 1. The lenses may be formed by epoxy molding. One lens may be arranged above the laser emitter to focus the emitted laser energy toward the receiving photodiode, and the other lens may be arranged above the photodiode to focus incident laser energy onto the photodiode.

In some embodiments, one lens is arranged above the substrate, laser emitter, and the photodiode as in shown in the embodiment of FIG. 4. The lens includes a first side facing the substrate, laser emitter, and photodiode, and a second side. The lens may be formed (e.g., a by epoxy molding) to have a hybrid curvature to focus laser energy incident on the second side of the lens toward the photodiode. In certain embodiments, the hybrid curvature focuses the laser energy incident on the second side of the lens toward the photodiode as a focal line. In certain embodiments, the lens is formed so that at least a portion of the curvature of the lens includes a partial cylinder.

The method 500 may include placing a first TX/RX pair opposite a second TX/RX pair in a single an electronics package. The TX/RX pairs may be separated by an air gap. This arrangement provides a duplex serial optical interface over an air space. The optical interface provides a robust communication link, and may be used to implement an optical interface for any one of a USB, a PCI or PCIe, an HDMI, a TBT interface, a DP interface or other serial and serial-parallel bus. The optical interface can be included in a personal computer (PC) or a mobile computing device such as a smart phone, tablet, compute stick, etc. The optical interface can be used to connect peripheral devices to the PC or mobile computing device. The optical interface can be included in a server, mini-server, or micro-server, and can be used for agnostic backplane connections to servers.

Figure 6:
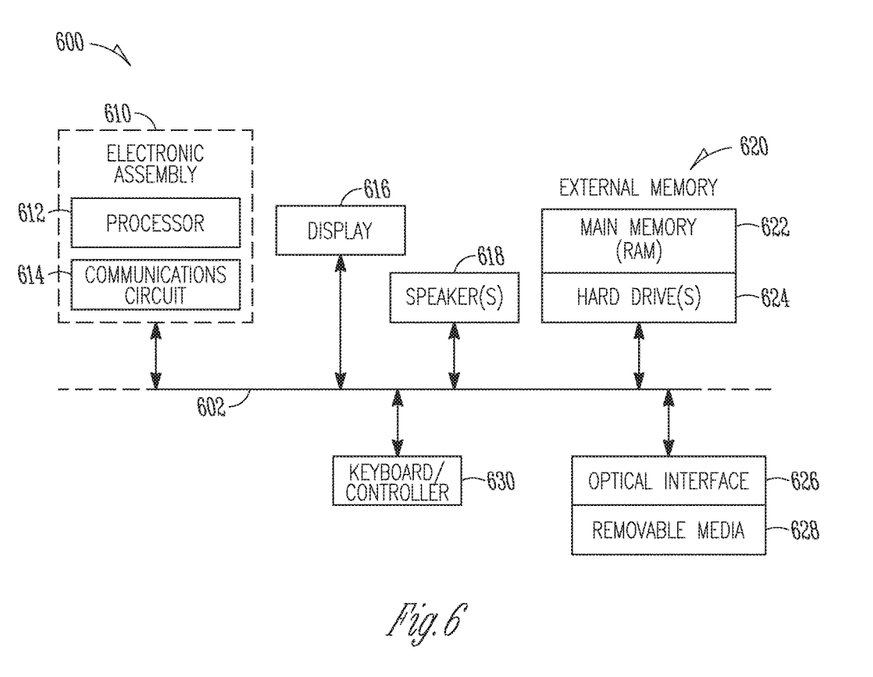
FIG. 6 is a block diagram of an example of an electronic system in accordance with some embodiments.

FIG. 6 is a block diagram of an example of an electronic system 600 incorporating at least one electronic circuit assembly and in accordance with at least one embodiment of the invention. Electronic system 600 is merely one example in which embodiments of the present invention can be used. Examples of electronic systems 600 include, but are not limited to personal computers, tablet computers, mobile telephones, game devices, compute sticks etc. In this example, electronic system 600 comprises a data processing system that includes a system bus 602 to couple the various components of the system. System bus 602 provides communications links among the various components of the electronic system 600 and can be implemented as a single bus, as a combination of busses, or in any other suitable manner.

An electronic assembly 610 can be coupled to system bus 602. The electronic assembly 610 can include any circuit or combination of circuits. In one embodiment, the electronic assembly 610 includes a processor 612 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that can be included in electronic assembly 610 are a custom circuit, an application-specific integrated circuit (ASIC), or the like. The electronic assembly can include a communications circuit 614 for use in wireless devices like mobile telephones, personal data assistants, portable computers, two-way radios, and similar electronic systems.

The electronic system 600 can also include an external memory 620, which in turn can include one or more memory elements suitable to the particular application, such as a main memory 622 in the form of random access memory (RAM), one or more hard drives 624. The electronic assembly 610 can also include an optical interface 626 for removable media 628 such as compact disks (CD), flash memory cards, digital video disk (DVD), and the like.

The electronic system 600 can also include a display device 616, one or more speakers 618, and a keyboard and/or controller 630, which can include a mouse, trackball, touch screen, voice-recognition device, or any other device that permits a system user to input information into and receive information from the electronic system 600.

Additional Description and Examples

Example includes subject matter (such as an apparatus) comprising: a substrate; a laser emitter arranged on the substrate, wherein laser energy emitted by the laser emitter includes a center frequency; an optical receiver arranged on the substrate; and a laser bandpass filter arranged above the optical receiver, wherein the bandpass filter has a passband that excludes the center frequency of the laser energy.

In Example 2, the subject matter of Example 1 optionally includes a lens arranged above the substrate, laser emitter, and optical receiver, wherein the lens is configured to focus laser energy received over air toward the optical receiver.

In Example 3, the subject matter of one or both of Examples 1 and 2 optionally includes a lens shaped to focus the laser energy toward the photodiode as a focal line.

In Example 4, the subject matter of one or any combination of Examples 1-3 optionally includes a laser bandpass filter that includes a thin film anti-reflective coating (ARC) configured to exclude the center frequency of the laser energy.

In Example 5, the subject matter of one or any combination of Examples 1-4 includes a laser bandpass filter that includes a Lyot filter.

In Example 6, the subject matter of one or any combination of Examples 1-5 optionally includes a laser bandpass filter that includes a dichroic filter.

In Example 7, the subject matter of one or any combination of Examples 1-6 optionally includes an isolation barrier arranged on the substrate between the laser emitter and the photodiode.

In Example 8, the subject matter of one or any combination of Examples 1-7 optionally includes a laser emitter that includes a vertical-cavity surface emitting laser (VCSEL), and an optical receiver that includes a photodiode.

In Example 9, the subject matter of one or any combination of Examples 1-8 optionally includes logic circuitry configured to transmit and receive signals communicated according to a duplex communication protocol, and wherein the laser emitter, the optical receiver, and the logic circuitry are included in a same electronics package.

Example 10 can include subject matter (such as a method of making on optical transmitter receiver pair), or can optionally be combined with one or any combination of Examples 1-9 to include such subject matter, comprising: arranging a photodiode and a laser emitter on a substrate, wherein laser energy emitted by the laser emitter includes a center frequency; and arranging a laser bandpass filter above the photodiode, wherein a passband of the bandpass filter excludes the center frequency of the laser energy.

In Example 11, the subject matter of Example 10 optionally includes arranging a lens above the substrate, laser emitter, and photodiode, wherein the lens includes a first side facing the substrate, laser emitter, and photodiode, and a second side, wherein the lens is configured to focus laser energy incident on the second side of the lens toward the photodiode as a focal line.

In Example 12, the subject matter of one or both of Examples 10 and 11 optionally includes forming a dichroic filter on the photodiode.

In Example 13, the subject matter of one or any combination of Examples 10-12 optionally includes arranging a Lyot filter above the photodiode.

In Example 14, the subject matter of one or any combination of Examples 10-13 optionally includes arranging an isolation barrier on the substrate between the laser emitter and the photodiode, and arranging a vertical-cavity surface emitting laser (VCSEL) on the substrate.

Example 15 includes subject matter (such as an apparatus), or can optionally be combined one or any combination of Examples 1-14 to include such subject matter, comprising an optical interface, the optical interface including: an optical interface host side including: a first substrate; a first laser emitter arranged on the substrate, wherein laser energy emitted by the first laser emitter includes a first center frequency; a first photodiode arranged on the first substrate; and a first laser bandpass filter arranged above the first photodiode; an optical interface peripheral side separated from the optical interface host side by an air space, the interface peripheral side including: a second substrate; a second laser emitter arranged on the substrate, wherein laser energy emitted by the second laser emitter has a second center frequency; a second photodiode arranged on the second substrate; and a second laser bandpass filter arranged above the second photodiode, wherein a passband of the second laser bandpass filter excludes the second center frequency and includes the first center frequency, and a passband of the first laser bandpass filter excludes the first center frequency and includes the second center frequency.

In Example 16, the subject matter of Example 15 optionally includes a mechanical connector that includes a first connector body portion and a second connector body portion, wherein the optical interface host side is included in the first connector body portion and the optical interface peripheral side is included in the second connector body portion, wherein connection of the first connector body portion with the second connector body portion arranges the optical interface host side opposite the optical interface peripheral side by the air space, and wherein the connection of the first connector body portion with the second connector body portion is reversible to arrange the first laser emitter opposite the second photodiode and the second laser emitter opposite the first photodiode, or to arrange the first laser emitter opposite the second laser emitter and the first photodiode opposite the second photodiode.

In Example 17, the subject matter of one or both of Examples 15 and 16 optionally include a first lens arranged above the first laser emitter and the first photodiode, and a second lens arranged above the second laser emitter and the second photodiode, wherein the first lens is configured to focus laser energy as a focal line toward the first photodiode and the second lens is configured to focus laser energy as a focal line toward the second photodiode.

In Example 18, the subject matter of one or any combination of Examples 15-17 optionally includes logic circuitry electrically connected to one or both of the host side of the optical interface and the peripheral side of the optical interface, wherein the logic circuitry is configured to communicate signals via the optical interface according to a duplex communication protocol.

In Example 19, the subject matter of one or any combination of Examples 15-18 optionally includes logic circuitry configured to communicate signals via the optical interface according to a universal serial bus (USB) protocol.

In Example 20, the subject matter of one or any combination of Examples 15-19 optionally includes a first transimpedance amplifier (TIA) on the first substrate and a second TIA on the second substrate, wherein the first laser emitter, the second photodiode and the second TIA form a first communication lane, and the second laser emitter, the first photodiode and the first TIA form a second communication lane.

These several non-limiting embodiments and examples can be combined using any permutation or combination. The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   a substrate;
   a laser emitter arranged on the substrate, wherein laser energy emitted by the laser emitter includes a center frequency;
   an optical receiver arranged on the substrate;
   a laser bandpass filter arranged above the optical receiver, wherein the bandpass filter has a passband that excludes the center frequency of the emitted laser energy; and
   a lens arranged above the substrate, laser emitter, and optical receiver, wherein the lens is shaped to focus laser energy received over air toward the optical receiver as a focal line.

2. The apparatus of claim 1, wherein the optical receiver includes a photodiode.

3. The apparatus of claim 1, wherein the laser bandpass filter includes a thin film anti-reflective coating (ARC) configured to exclude the center frequency of the laser energy.

4. The apparatus of claim 1, wherein the laser bandpass filter includes a Lyot filter.

5. The apparatus of claim 1, wherein the laser bandpass filter includes a dichroic filter.

6. The apparatus of claim 1, including an isolation barrier arranged on the substrate between the laser emitter and the photodiode.

7. The apparatus of claim 1, wherein the laser emitter includes a vertical-cavity surface emitting laser (VCSEL), and the optical receiver includes a photodiode.

8. The apparatus of claim 1, including logic circuitry configured to transmit and receive signals communicated according to a duplex communication protocol, and wherein the laser emitter, the optical receiver, and the logic circuitry are included in a same electronics package.

9. A method comprising:
arranging a photodiode and a laser emitter on a substrate, wherein laser energy emitted by the laser emitter includes a center frequency; and
arranging a laser bandpass filter above the photodiode, wherein a passband of the bandpass filter excludes the center frequency of the emitted laser energy; and
arranging a lens above the substrate, laser emitter, and optical receiver, wherein the lens is shaped to focus laser energy received over air toward the optical receiver as a focal line.

10. The method of claim 9, wherein the lens includes a first side facing the substrate, laser emitter, and photodiode, and a second side, wherein the lens is configured to focus laser energy incident on the second side of the lens toward the photodiode as a focal line.

11. The method of claim 9, wherein arranging a laser bandpass filter above the photodiode includes disposing a dichroic filter above the photodiode.

12. The method of claim 9, wherein arranging a laser bandpass filter above the photodiode includes arranging a Lyot filter above the photodiode.

13. The method of claim 9, including arranging an isolation barrier on the substrate between the laser emitter and the photodiode, and wherein the arranging the laser emitter on the substrate includes arranging a vertical-cavity surface emitting laser (VCSEL) on the substrate.

14. An apparatus comprising an optical interface, the optical interface including:
an optical interface host side including:
a first substrate;
a first laser emitter arranged on the substrate, wherein laser energy emitted by the first laser emitter includes a first center frequency;
a first photodiode arranged on the first substrate;
a first laser bandpass filter arranged above the first photodiode; and
a first lens arranged above the first substrate, first laser emitter, and photodiode, wherein the lens is shaped to focus laser energy received over air toward the optical receiver as a focal line;
an optical interface peripheral side separated from the optical interface host side by an air space, the interface peripheral side including:
a second substrate;
a second laser emitter arranged on the substrate, wherein laser energy emitted by the second laser emitter has a second center frequency;
a second photodiode arranged on the second substrate;
a second laser bandpass filter arranged above the second photodiode; and
a second lens arranged above the second substrate, second laser emitter, and photodiode, wherein the second lens is shaped to focus the laser energy received over air toward the second photodiode as a focal line,
wherein a passband of the second laser bandpass filter excludes the second center frequency and includes the first center frequency, and a passband of the first laser bandpass filter excludes the first center frequency and includes the second center frequency.

15. The apparatus of claim 14, including a mechanical connector that includes a first connector body portion and a second connector body portion,
wherein the optical interface host side is included in the first connector body portion and the optical interface peripheral side is included in the second connector body portion,
wherein connection of the first connector body portion with the second connector body portion arranges the optical interface host side opposite the optical interface peripheral side by the air space, and
wherein the connection of the first connector body portion with the second connector body portion is reversible to arrange the first laser emitter opposite the second photodiode and the second laser emitter opposite the first photodiode, or to arrange the first laser emitter opposite the second laser emitter and the first photodiode opposite the second photodiode.

16. The apparatus of claim 14, including logic circuitry electrically connected to one or both of the host side of the optical interface and the peripheral side of the optical interface, wherein the logic circuitry is configured to communicate signals via the optical interface according to a duplex communication protocol.

17. The apparatus of claim 16, wherein the logic circuitry is configured to communicate signals via the optical interface according to a universal serial bus (USB) protocol.

18. The apparatus of claim 14, including a first transimpedance amplifier (TIA) on the first substrate and a second TIA on the second substrate, wherein the first laser emitter, the second photodiode and the second TIA form a first communication lane, and the second laser emitter, the first photodiode and the first TIA form a second communication lane.

* * * * *